United States Patent [19]

Leppek et al.

[11] Patent Number: 5,102,207
[45] Date of Patent: Apr. 7, 1992

[54] ANTILOCK BRAKE SYSTEM WITH MOTOR CURRENT CONTROL OF THE PRESSURE MODULATOR

[75] Inventors: Kevin G. Leppek, Troy; Martin A. Hogan, Northville, both of Mich.; Peter J. Spadafora, Howald, Alan J. Lee, Farmington Hills, Mich.

[73] Assignees: General Motors Corporation, Detroit, Mich.; Delco Electronics Corporation, Kokomo, Ind.

[21] Appl. No.: 620,418

[22] Filed: Dec. 3, 1990

[51] Int. Cl.$^5$ ................ B60T 8/42; G06G 7/48
[52] U.S. Cl. ................ 303/115 EC; 303/DIG. 4; 364/426.02
[58] Field of Search ............ 364/426.02; 303/91, 303/93, 100, 103, 110, 111, 115 R, 115 EC, DIG. 3, DIG. 4

[56] References Cited

U.S. PATENT DOCUMENTS

| | | | |
|---|---|---|---|
| 4,750,124 | 6/1988 | Lin et al. | 303/100 X |
| 4,755,946 | 7/1988 | Lin | 303/100 X |
| 4,783,127 | 11/1988 | Kade et al. | 303/100 |
| 4,807,134 | 2/1989 | Agarwal et al. | 364/426.02 |
| 4,835,695 | 5/1989 | Walenty et al. | 303/100 X |
| 4,881,784 | 11/1989 | Leppek | 303/100 |
| 4,917,445 | 4/1990 | Leppek et al. | 303/100 |

Primary Examiner—Robert J. Oberleitner
Assistant Examiner—Alfred Muratori
Attorney, Agent, or Firm—Howard N. Conkey

[57] ABSTRACT

The period of an initial apply motor current in each apply phase of an antilock brake pressure cycle in a motor driven pressure modulator antilock braking system is adaptively controlled following a sensed recovery from an incipient wheel lockup condition to establish substantially a steady state condition relationship between current and pressure before motor current is ramped to ramp brake pressure. The period of the initial apply motor current is made a function of the amount of pressure decrease during a prior release phase portion of the antilock brake cycle to account for the greater increase in brake pressure to the initial reapply value.

5 Claims, 4 Drawing Sheets

ANTILOCK BRAKE SYSTEM WITH MOTOR CURRENT CONTROL OF THE PRESSURE MODULATOR

BACKGROUND OF THE INVENTION

This invention relates to an antilock control system and method for controlling vehicle wheel brakes.

When the brakes of a vehicle are applied, a braking force is generated between the wheel and the road surface that is dependent upon various parameters which include the road surface condition and the amount of slip between the wheel and the road surface. This braking force increases as slip increases until a critical value of slip is surpassed. Beyond the critical value of slip, the braking force decreases and the wheel rapidly approaches lockup. Therefore, to achieve stable braking, an antilock control system seeks to operate wheel slip at or near the critical slip value. An antilock control system achieves this objective by detecting an incipient wheel lock condition. Upon detecting an incipient wheel lock condition, the antilock control system releases pressure at the wheel brake to allow recovery from the incipient wheel lock condition. Upon recovery, brake pressure is reapplied. Criteria used to indicate an incipient wheel lock condition includes excessive wheel deceleration and/or excessive wheel slip.

One known antilock control system uses a motor driven pressure modulator in which a DC torque motor drives a piston in a cylinder whose volume is modulated to control the hydraulic brake pressure at the wheel brake. In this system, because of the relationship between motor current, motor torque and motor load represented by the hydraulic brake pressure on the head of the piston, the value of motor current is used as a representation of brake pressure and is controlled to provide control of the brake pressure. In one such system, when an incipient wheel lock condition is sensed, the value of motor current at this time is stored as a representation of the brake pressure producing the maximum braking force coexisting with the critical slip between the wheel and the road surface and the motor current is controlled to quickly retract the piston to release brake pressure to allow recovery from the incipient wheel lock condition. When a recovery from the incipient wheel lock condition is sensed, the motor current is controlled to extend the piston to reapply brake pressure. In reapplying the brake pressure, the pressure is quickly established substantially at the brake pressure producing the maximum braking force by quickly establishing the motor current at a significant fraction of the motor current stored at the time an incipient wheel lock condition was sensed. Thereafter, brake pressure is ramped at a controlled rate which may be a function of wheel slip and acceleration by ramping the motor current in direction applying brake pressure until an incipient wheel lock condition is again sensed after which the cycle is repeated.

In the foregoing form of motor driven pressure modulator, the following dynamic relationships exist: (a) when the brake pressure load on the motor is equal to the motor torque, the motor does not rotate, the piston remains stationary, and the motor current is a measure of the brake pressure and (b) when the brake pressure load on the motor is less than the motor torque, the motor accelerates and rotates at some speed while extending the piston to increase brake pressure. In this latter situation, the speed of the motor is unknown and the motor current is not a true indicator of brake pressure. Accordingly, when a recovery condition from an incipient wheel lockup condition is sensed and motor current is controlled to the significant fraction of the previously stored motor current representing the brake pressure producing the maximum braking force, the motor begins to accelerate to reapply brake pressure. During this period, the relationship between the motor current and brake pressure is unknown so that the value of brake pressure is unknown during this period. It is desirable to begin ramping the motor current when the motor speed in response to the initial reapply current has decreased so that a predictable relationship exists between the motor current and pressure. Thereafter, the motor current may be ramped such as described in copending application Ser. No. 07/531,397, filed May 31, 1990, in the names of Martin A. Hogan et al, and assigned to the assignee of this invention, to provide a desired control of the brake pressure.

SUMMARY OF THE INVENTION

In general, this invention provides for adaptively controlling the period of the initial apply current corresponding to the desired initial apply pressure following a sensed recovery from an incipient wheel lockup condition to establish substantially a steady state condition relationship between current and pressure before the current ramping portion of the reapply cycle is initiated. This provides for a predictable relationship between motor current and brake pressure.

In accord with a principal aspect of this invention, the initial current apply period following a sensed recovery of an incipient wheel lockup condition is made a function of the amount of pressure increase from the pressure at the end of the release phase to the desired initial apply pressure.

In one aspect of the invention, the amount of pressure increase is represented by the pressure decrease during the release phase portion of the antilock brake cycle. In general, the lower the pressure is released during the release phase, the longer the duration of the initial reapply current. This accounts for the greater increase in brake pressure to the initial reapply value and therefore the longer period required for the motor to accelerate and move the piston to achieve a condition where the brake pressure load on the motor is substantially equal to the motor torque, a condition whereat the motor speed is substantially zero.

In accord with another aspect of this invention, the duration of the application of the initial apply current having a value determined to establish a brake pressure producing substantially to the maximum braking force is controlled as a function of the brake pressure when recovery from an incipient wheel lock condition is first sensed and a value related to the pressure represented by the motor current stored when the incipient wheel lockup condition was first sensed. This difference provides an estimate of the time required for the motor to again re-establish the pressure at a pressure having a predetermined relationship to the pressure existing when the incipient wheel lockup condition was first sensed.

When motor current is controlled to quickly release brake pressure, the relationship between motor current and brake pressure is unpredictable so that when recovery from an incipient wheel lockup condition is first sensed, the brake pressure and the steady state motor current corresponding thereto are unknown. In accord with another aspect of this invention, the brake pressure existing when recovery from an incipient wheel lockup condition is first sensed as represented by the steady state motor current corresponding thereto is estimated. Based on this estimated pressure, the duration of the initial period of application of the motor current to establish the initial reapply brake pressure is controlled based upon the relationship between the estimated pressure and a value related to the desired initial reapply pressure.

In another aspect of this invention, the current corresponding to the brake pressure existing when recovery from an incipient wheel lockup condition is first sensed is estimated by decaying the value of motor current existing when the incipient wheel lockup condition was first sensed in a manner that substantially tracks the actual wheel brake pressure during the release portion of the antilock brake cycle. For example, the motor current may be decayed in a manner to match a predetermined pressure decay while the motor is controlled to release brake pressure. Accordingly, the estimated pressure represented by the decayed current provides a reference to establish the duration of the initial reapply period.

DESCRIPTION OF THE DRAWINGS

The invention may be best understood by reference to the following description of the preferred embodiment of the invention and the drawings in which.

DESCRIPTION OF THE PREFERRED EMBODIMENT

Figure 1:
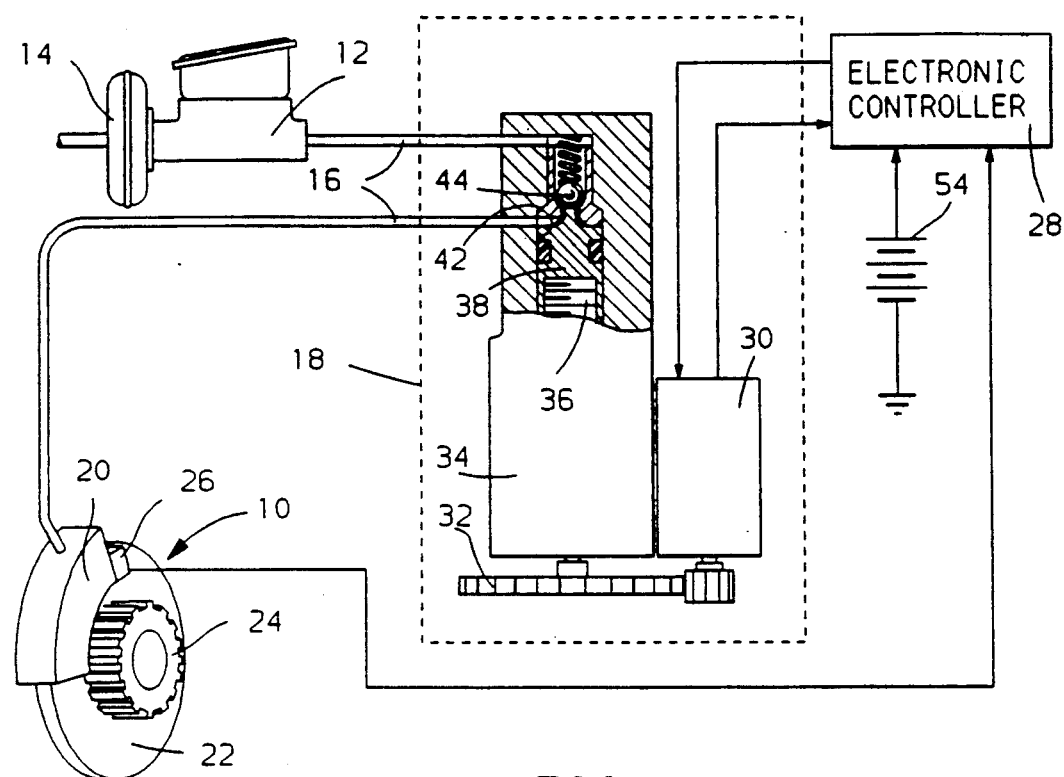
FIG. 1 is a diagram of a wheel braking system including a motor driven pressure modulator for limiting the wheel brake pressure for antilock brake control.

A wheel lock control system for a wheel of a motor vehicle is illustrated in FIG. 1. In general, the wheel includes a brake unit 10 operated by hydraulic pressure provided by a master cylinder 12 and a hydraulic boost unit 14 operated by the vehicle operator. The hydraulic fluid under pressure from the master cylinder 12 is provided to the brake unit 10 via brake lines 16 and a pressure modulator 18. The brake unit 10 is illustrated as a disc brake system that includes a caliper 20 located at a rotor 22. The wheel includes a wheel speed sensing assembly comprised of an exciter ring 24 rotated with the wheel and an electromagnetic sensor 26 which monitors the rotation of the exciter ring to provide a signal having a frequency proportional to the speed of the wheel. The wheel speed signal from the sensor 26 is provided to an electronic controller 28.

The pressure modulator 18 is controlled by the electronic controller 28 to limit the brake pressure applied to the wheel brake assembly 10 to prevent wheel lockup. The modulator 18 is illustrated in an inactive position where it is transparent to the braking system. This is the modulator home position during normal vehicle braking. In general, when the controller 28 senses a braking condition whereat the wheel is approaching an incipient wheel lock, the pressure modulator 18 is controlled to regulate the braking pressure to the wheel to maintain the braking of the wheel in a stable braking region. The pressure modulator 18 includes a DC torque motor 30 whose output shaft drives a gear train 32 which, in turn, rotates a linear ballscrew actuator 34. The ballscrew actuator contains a linearly stationary ballscrew which, when rotated, linearly positions a nut 36. The nut 36 terminates in a piston 38 such that as the linear ballscrew rotates, the piston 38 is either extended or retracted depending upon the direction of the rotation of the torque motor 30. The modulator 18 includes a housing 40 in which a cylinder 42 is formed. The piston 38 is reciprocally received within the cylinder 42. The cylinder 42 forms a portion of the fluid path between the master cylinder 12 and the wheel brake unit 10. Included within this fluid path is a normally closed ball check valve 44 which, when closed, isolates the master cylinder 12 from the brake unit 10. The ball check valve 44 is operated to an open position by the piston 38 when it is positioned in an extended position within the cylinder 42 as illustrated in FIG. 1.

When the ball check valve 44 is opened, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator. However, when the torque motor 30 is operated by the electronic controller 28 to modulate the braking pressure in the wheel brake unit 10, the piston 38 is retracted, allowing the ball check valve to seat and isolate the master cylinder 12 from the wheel brake unit 10 as long as the pressure in the cylinder 42 is less than the pressure from the master cylinder 12. Further retraction of the piston 38 functions to increase the volume in the cylinder 42 thereby decreasing the pressure applied to the wheel brake unit 10. By controlling the DC torque motor 30, a pressure at the wheel brake can therefore be modulated to controlled values less than the master cylinder 12 pressure output until such time that the piston 38 again unseats the ball check valve 34 or until the pressure generated by the pressure modulator at the wheel brake unit 10 exceeds the fluid pressure output of the master cylinder 12. When this latter condition exists, the ball check valve 44 is opened by the differential fluid pressure which limits the pressure of the wheel brake unit 10 at the master cylinder 12 pressure. In this manner, the wheel cylinder pressure can never exceed the operator established pressure.

Figure 2:
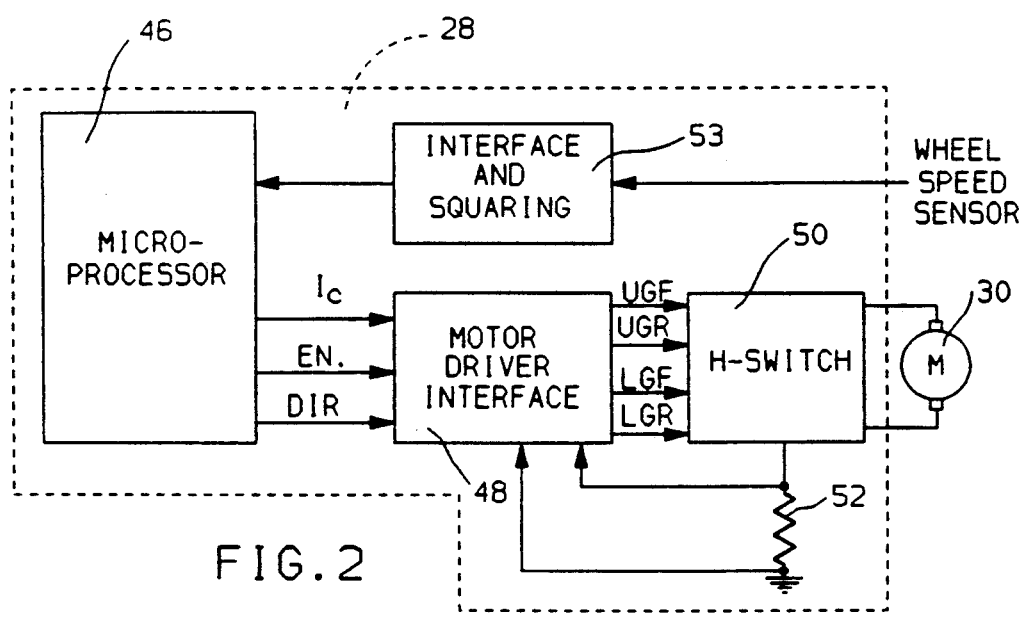
FIG. 2 is a diagram of the electronic controller of FIG. 1 for controlling the current to the motor of the pressure modulator of FIG. 1.

Referring to FIG. 2, the electronic controller 28 of FIG. 1 is illustrated and generally takes the form of a digital computer based controller. The controller includes a microprocessor 46 that is standard in form and includes the standard elements such as a central processing unit which executes an operating program permanently stored in a read-only memory which further stores tables and constants utilized in controlling the modulator 18, an analog-to-digital converter, a random access memory and input/output circuitry utilized to provide motor control signals to a motor driver interface circuit 48. The input/output circuit further includes input ports for receiving the wheel speed signal from the output of an interface and squaring circuit 53 having an input from the wheel speed sensor 26.

The motor driver interface circuit 48 receives an enable signal, a motor current command signal $I_c$ and a forward/reverse direction signal from the microprocessor 46 and controls an H-switch driver 50 to establish the commanded motor current $I_c$ in the required forward or reverse direction. The current to the torque motor 30 is controlled to the commanded value via a closed loop that responds to the actual motor current represented by the voltage across a sense resistor 52. In response to the direction and motor current command, the motor driver interface 48 energizes the upper and lower forward gates via the upper gate signal UGF and lower gate signal LGF to control the DC torque motor 30 in the forward direction to apply brake pressure and energizes the upper and lower reverse gates via the signals UGR and LGR to control the DC torque motor 30 in the reverse direction to retract the piston 38 to reduce pressure at the wheel brake. The microprocessor 46 may take the form of a Motorola single chip microcomputer MC-68HC11. The motor driver interface 48 and H-switch 50 may take the form of the driver illustrated in the U.S. Pat. No. 4,835,695 issued May 30, 1989.

When the speed of the DC torque motor 30 is low as current is controlled in the forward direction to apply pressure to the brakes 20, the motor current is a measure of the torque and therefore the brake pressure. However, when the motor current is controlled in the reverse direction to release brake pressure or when the motor 30 is rotating in the forward direction, the motor current sensed by the resistor 52 is not a true indicator of brake pressure.

During a typical antilock brake control cycle established by the system of FIGS. 1 and 2, when an incipient wheel lock condition is sensed, the motor current is controlled to quickly retract the piston 38 to release brake pressure to allow recovery from the incipient wheel lock condition. This reversal is accomplished by commanding a reverse motor direction and setting the command current $I_c$ at a reverse current value $I_r$. The motor driver interface 48 responds to these commands by energizing the upper and lower reverse H-switch gate switches to drive the motor 30 in reverse direction at the commanded current level. As indicated, this current is not representative of the brake pressure existing at the wheel brake while the brake pressure is being released. When recovery from the incipient wheel lock condition is sensed, brake pressure is reapplied at a value related to the pressure existing at the time an incipient wheel lock condition was first sensed and thereafter ramped by commanding a forward motor direction and setting the command current $I_c$ at a forward apply current value $I_a$, first at an initial value that is related to the motor current value when an incipient wheel lock condition was first sensed and thereafter that is ramped in an increasing direction to ramp the brake pressure. The motor driver interface responds to these commands by energizing the upper and lower H-switch gate switches to drive the motor in a forward direction at the commanded level. Brake pressure is ramped by ramping the value of the apply current value $I_a$. This ramp function is continued until an incipient wheel lock condition is again sensed after which the cycle is repeated.

In operation of the pressure modulator 18, when an incipient wheel lockup condition is sensed, the motor current value IREF is stored as a measure of the value of brake pressure $P_{REF}$ producing the maximum braking effort between the tire and road surface. The brake pressure is then rapidly released by controlling the motor current in reverse direction. When recovery from the incipient wheel lockup condition is sensed in response to the decreased brake pressure, the motor current is reapplied to a predetermined significant fraction $K_{FRAC}$ of the stored current value $I_{REF}$ representing the brake pressure $P_{REF}$ so as to quickly re-establish the brake pressure at a value substantially producing the maximum braking effort between the tire and road surface. Reapplication of the apply current to re-establish the braking pressure first functions to reverse the motor movement and induce motor movement in the pressure apply direction. The motor then rotates in the forward direction until such time that the brake pressure load substantially equals the motor torque represented by the applied motor current at which time the brake pressure is equal to $K_{FRAC}*P_{REF}$. A period of time is required for the motor to stop rotation in the reverse direction and to reaccelerate and apply brake pressure at the commanded brake pressure level.

Ramping of the motor current is not begun until such time that the motor movement has re-established the brake pressure at the significant fraction $K_{FRAC}$ of the value $P_{REF}$. Accordingly, the duration of the initial time period that the initial apply current is applied is adaptively controlled so as to assure that the motor has achieved substantially a steady state condition before the current is ramped to ramp the brake pressure while at the same time preventing an unnecessary delay before ramping of brake pressure is initiated.

Since the time required for the motor to re-establish the pressure corresponding to the applied current is dependent upon the amount of increase in brake pressure required, the duration of the initial apply period is made dependent upon the amount of pressure increase. In this embodiment, the amount of pressure increase is represented by the pressure decrease during the pressure release phase of the braking cycle, the greater the pressure decrease, the greater the required increase in brake pressure to achieve the initial apply brake pressure which is dependent upon the initial pressure at the beginning of the pressure release phase. In order to provide an estimate of the brake pressure when recovery from the incipient wheel lockup condition was first sensed, this invention provides for decaying a motor current value $I_{EST}$ of the stored motor current from the initial value $I_{REF}$ while the brake pressure is being released in a manner so as to mimic the actual decrease in brake pressure. Therefore, when a recovery condition is first sensed, the decayed value of motor current represents an estimate of the actual brake pressure $P_{EST}$ existing at the wheel brake. The duration of the initial apply period is then made dependent upon the pressure drop during the release of brake pressure which is the difference between this decayed value $I_{EST}$ estimating the brake pressure $P_{EST}$ at the time recovery from an incipient lockup condition is sensed and the value $I_{REF}$ representing the brake pressure $P_{REF}$ at the time the incipient wheel lockup condition was first sensed. The initial apply period is such that a substantially steady state condition of the motor is established before ramping brake pressure is initiated based on a predictable relationship between motor current and brake pressure while at the same time an unnecessarily lengthy delay before the ramping of the brake pressure is initiated is avoided. During the ramping of the brake pressure, the predictable relationship is maintained due to the low ramp rate and therefore motor speed, which relationship may be assured by motor speed control as described in copending application Ser. No. 531,397 filed on May 31, 1990 and assigned to the assignee of this invention.

The operation of the electronic controller 28 in controlling the DC torque motor 30 in accord with this invention is illustrated in FIGS. 3-6. The read-only memory of the microprocessor 46 contains the instructions necessary to implement the algorithm as diagrammed in those figures.

Figure 3:
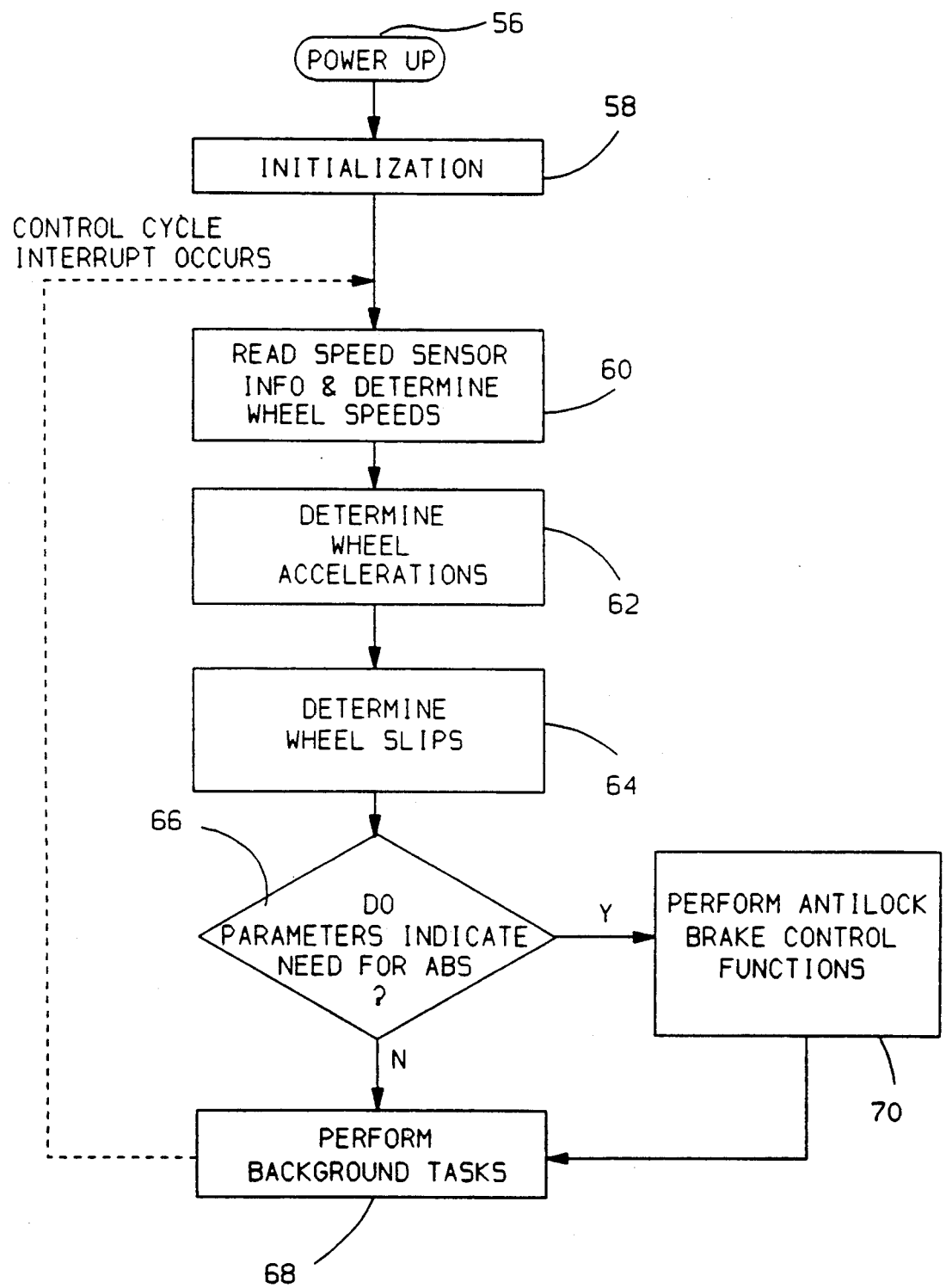
FIGS. 3-6 are flow diagrams illustrating the operation of the electronic controller of FIG. 1 in accord with the principles of this invention.

Referring first to FIG. 3, when power is first applied to this system from a vehicle battery 54 (FIG. 1) such as when a conventional vehicle ignition switch (not illustrated) is rotated to its "on" position, the computer program is initiated at a point 56 and then provides for system initialization at step 58 which entails clearing registers, initializing various RAM variables to calibrated values and other functions. When the initialization routine is completed, the program then proceeds to perform antilock brake control functions as required. These antilock control functions are performed by executing a control cycle in response to each of repeated control cycle interrupts which are generated at predetermined fixed time intervals such as 5 milliseconds. Upon the occurrence of a control cycle interrupt, the digital computer begins executing the functions embodied in the control cycle. First, at step 60, wheel speed sensor information is read and wheel speed is computed for each of the vehicle wheels. Thereafter, the routine determines the individual wheel accelerations at step 62 and the individual wheel slip values at step 64. From the computed values of wheel acceleration and wheel slip, the program determines at step 66 whether or not those parameters represent the need for antilock brake pressure modulation for any wheel.

If antilock control of wheel brake pressure is not required, the program proceeds to perform background tasks at step 68. These tasks may include diagnostic functions as well as other functions. However, if step 66 determines that a need for antilock brake pressure modulation for any wheel is required, the program proceeds to a step 70 where antilock brake control functions are executed. Once those functions are executed, the program proceeds to the step 68 previously described.

The foregoing steps 60 through 70 are repeated once for each control cycle. Thus, when a control cycle interrupt occurs, a new cycle begins at step 60 and the functions represented by steps 60 through 70 are again repeated as previously described. Repeated executions of step 70 when antilock brake control is required establishes the general brake cycle as previously described wherein when the wheel slip and acceleration conditions represent an incipient wheel lockup condition, a pressure release mode is indicated and brake pressure is released to allow the wheel to recover from the incipient wheel lockup condition and when wheel acceleration and slip conditions represent a recovered condition, an apply mode is indicated and wheel pressure is reapplied and ramped until another incipient wheel lockup condition is sensed at which time the release mode is indicated and the cycle is repeated.

Figure 4:
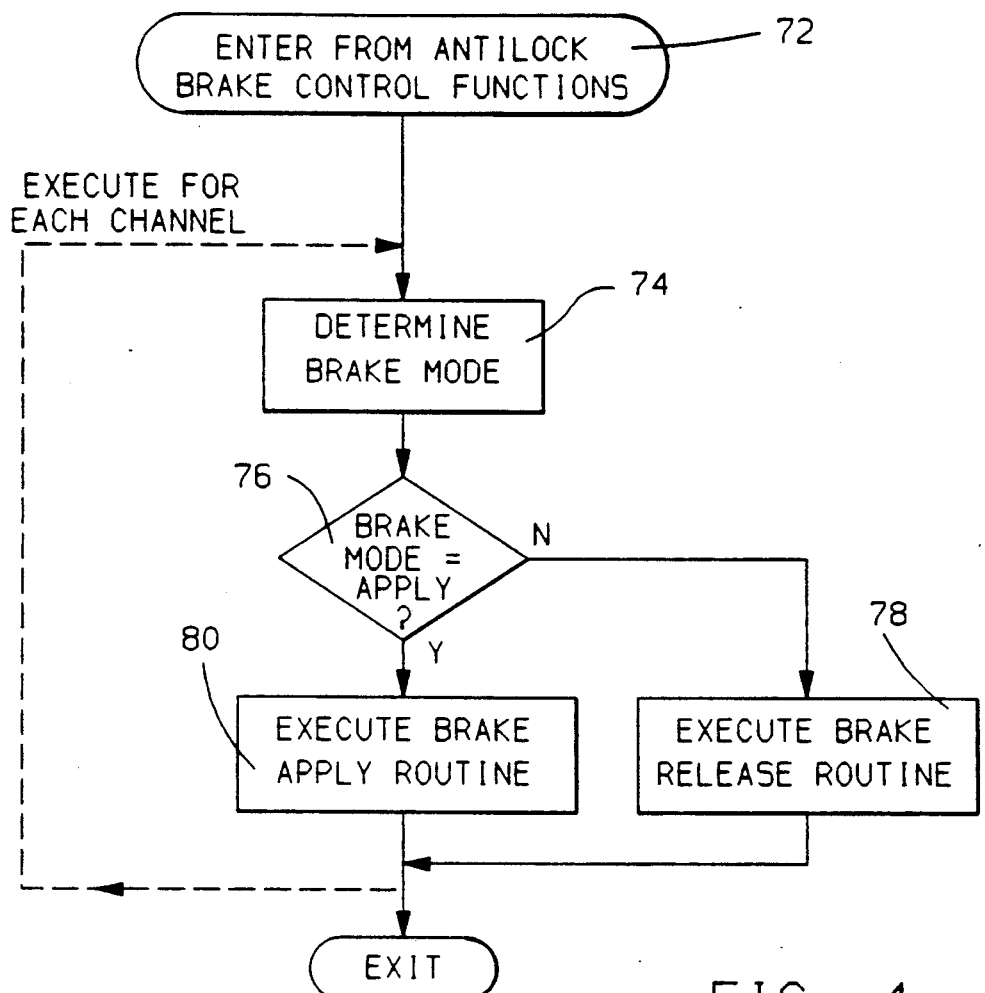

Referring to FIG. 4, there is illustrated the antilock brake control functions executed once for each braking channel where each channel includes a modulator 18. Where the four wheels of the vehicle are controlled independently, this requires the routine of FIG. 4 to be executed four times, once for each wheel with its related parameters. In another system, the rear brakes may be controlled by a single modulator such that the routine of FIG. 4 then is executed once for each front wheel and once for the combined rear wheels.

The antilock brake control routine 70 of FIG. 3 is entered at step 72 and then proceeds to a step 74 that selects the required brake mode. In general, the selection is made from a number of apply modes, such as 3, each having a related rate of increase in brake pressure as a function of wheel acceleration and wheel slip and one or more release modes also as a function of wheel acceleration and wheel slip. For example, the apply modes may provide for higher rates of increase in brake pressure with increasing values of wheel acceleration and with decreasing values of wheel slip. The release modes may provide for full release with high wheel slip and high wheel acceleration values and step-down release with lower wheel slip and wheel acceleration values.

In this embodiment, the particular apply or release brake mode is determined via a ROM stored lookup table storing the various apply and release brake modes as a function of wheel acceleration and wheel slip. The stored brake modes established a threshold between pressure apply and pressure release as a function of wheel acceleration and wheel slip. An incipient wheel lockup condition is indicated when the lookup table first indicates one of the brake release modes whereas a recovered condition is indicated when the lookup table first indicates one of the brake apply modes.

Step 76 then determines whether the brake mode determined at step 74 is one of the apply modes. If not, indicating one of the release modes in response to an incipient wheel lockup condition, the program proceeds to a step 78 which executes a brake release mode routine. In general, repeated executions of the brake release mode 78 provide control of the torque motor 30 of the respective wheel in reverse direction to retract the piston 38 to reduce the brake pressure to allow wheel recovery from the incipient wheel lockup condition.

A wheel recovery condition resulting from repeated executions of the brake release mode 78 is detected at step 74 when the lookup table first indicates one of the pressure apply modes for the wheel acceleration and wheel slip conditions. When this condition is determined at step 76, the program proceeds to a step 80 where the apply current $I_a$ for reapplying brake pressure is determined. In the preferred mode, when step 74 first indicates an apply mode, a large bump current in the forward direction is commanded to the motor to stop the rotation of the motor in the reverse direction and to initiate rotation of the motor in the forward direction. Thereafter, the motor current is set to the significant fraction $K_{FRAC}$ of the value $I_{REF}$, the motor current at the time the prior incipient lockup condition was first sensed as indicated when the prior brake release mode was first indicated by step 74. As previously described, the period of application of this current in accord with this invention is a function of the amount of increase in brake pressure from the release pressure to the initial apply brake pressure represented by the current value $K_{FRAC}*I_{REF}$. Following expiration of this initial time period at which time the predictable relationship between motor current and brake pressure exists so that motor current is a measure of the brake pressure, the motor current is ramped with repeated executions of the step 80 at a controlled rate to increase the brake pressure at the wheel brake 20 until an incipient wheel lock condition is again sensed by step 74 determining a release mode via the lookup table in response to the wheel acceleration and slip values.

Figure 5:
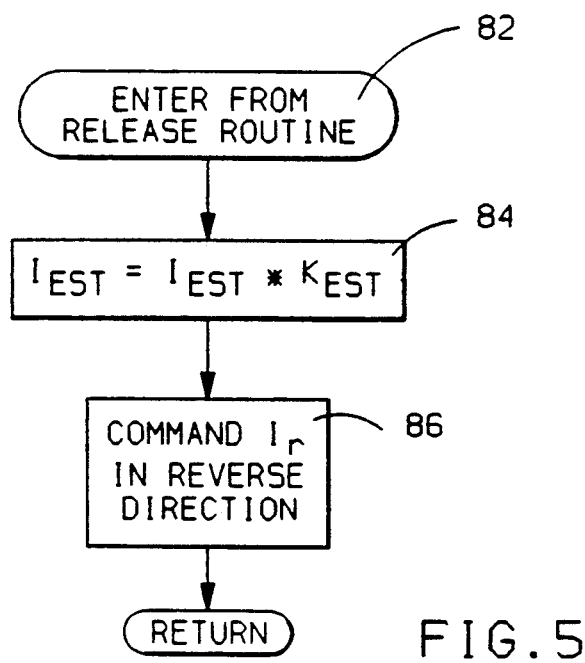

Referring to FIG. 5, there is illustrated the routine embodied in the brake release routine 78 of FIG. 4 for estimating the pressure at the wheel brake as the pressure is being released in response to a brake release mode being indicated at step 74. This estimation is required since during release, motor current is not a measure of brake pressure. This routine is entered at step 82 and proceeds to a step 84 where a motor current value $I_{EST}$ is decayed exponentially in accord with the expression $I_{EST}*K_{EST}$ where $K_{EST}$ is a fraction less than 1 establishing the rate of decrease in the estimated pressure. $I_{EST}$ has an initial value equal to the motor current value $I_{REF}$ when a release mode is first indicated by step 74. Further, the fraction $K_{EST}$ is a calibration constant stored in ROM and which, in conjunction with the repetition rate of the control cycle, is a predetermined value determined to decay the value of $I_{EST}$ to mimic the actual rate of pressure decease at the wheel brake during pressure release. Therefore, the value of $I_{EST}$ is the current corresponding to the pressure at the wheel brake during the brake release phase of the brake pressure cycle and which, when applied to the motor in the pressure apply direction, would establish that brake pressure under steady state conditions.

Following step 84, the program proceeds to a step 86 where the program commands the release current $I_r$ in reverse direction to the DC torque motor 30. As long as step 74 indicates a brake release mode, step 78 is repeatedly executed to continually release the brake pressure via step 86 and to continually estimate the value of the brake pressure via step 84.

Release of brake pressure in response to repeated execution of the steps 72 through 78 results in the wheel recovering from the incipient lock condition. This recovered condition is detected at step 72 when the lookup table indicates a pressure apply mode for the wheel acceleration and wheel slip conditions. When step 74 indicates that step 72 has determined a pressure apply mode, step 84 is no longer executed so that the decayed value of $I_{EST}$ represents the estimated brake pressure $P_{EST}$ at the end of the release phase of the braking cycle. The program then proceeds to the step 80 where the brake apply routine establishes the apply motor current $I_a$ for applying brake pressure. In the preferred mode, the routine 80 first establishes the apply motor current $I_a$ at an initial high bump current value $I_b$ for a time $T_b$. As indicated, this current functions to stop the reverse motion of the motor and initiate forward movement of the motor to reapply brake pressure. Following expiration of time $T_b$, the routine 80 establishes the initial apply current $I_a$ at the value $K_{FRAC}*I_{REF}$ previously described to quickly establish the brake pressure at a value substantially producing the maximum braking effort.

The initial apply current is commanded to the torque motor 30 for an initial period $T_{init}$ which is determined to establish substantially a steady state condition of the torque motor 30. At this condition, the predictable current/pressure relationship is established to provide for intelligent control of the subsequent ramping of the brake pressure. The value of this initial period is made dependent upon the required increase in brake pressure to the desired initial apply pressure corresponding to the initial apply current by making the period proportional to the pressure drop during the release phase of the pressure cycle which is represented by the difference between the estimated pressure $P_{EST}$ represented by the decayed current value $I_{EST}$ when the recovery condition was first sensed and the pressure $P_{REF}$ represented by $I_{REF}$. In another embodiment, the initial period is made proportional to the required pressure increase to the initial apply current by making the period proportional to the difference between the decayed current value $I_{EST}$ and the initial reapply current $K_{FRAC}*I_{REF}$.

Figure 6:
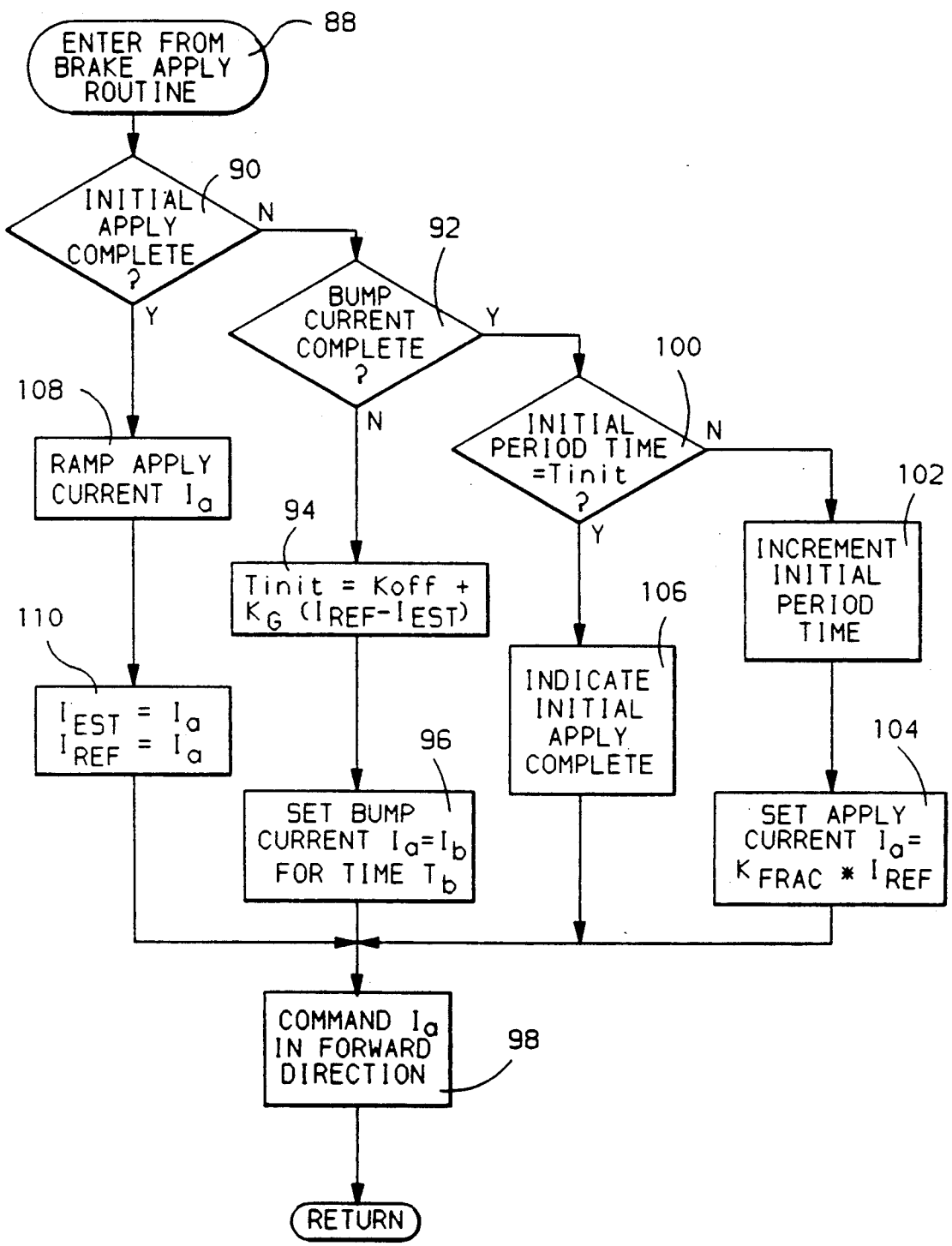

Referring to FIG. 6, the routine embodied in the brake apply routine 80 of FIG. 4 is entered at step 88 and proceeds to determine via step 90 if the application of the initial apply pressure has been completed. If not, the program proceeds to step 92 to determine whether or not the bump current previously referred to has been completed. If not, a step 94 initializes the value $T_{init}$ of the initial apply period in accord with the expression $K_{off}+K_G(I_{REF}-I_{EST})$, where $K_{off}$ is an offset value and $K_g$ is a gain constant. As previously indicated, this time is determined to establish a steady state condition of the motor whereat the current and pressure relationships are predictable. Thereafter, at step 96, the apply current value $I_a$ to the motor is set to the bump current value $I_b$ for a time period $T_b$ which may be the period of a single control cycle. Thereafter, the program commands the apply current $I_a$ in the forward direction at step 98.

Returning to step 92, when the bump current is completed upon expiration of the time $T_b$, the program determines at step 100 whether or not the initial period time is equal to the computed time $T_{init}$ set at step 94. If the initial period has not expired, the initial period is incremented at step 102 after which the apply current $I_a$ is set to the initial apply current value $K_{FRAC}*I_{REF}$. It is recalled that $I_{REF}$ is the motor current value at the time the incipient wheel lockup condition was last sensed and is a measure of the brake pressure $P_{REF}$ producing substantially the peak braking force between the tire and the road surface.

When step 100 determines that the initial time period $T_{init}$ has expired, the initial apply is indicated as complete at step 106 such as by setting an appropriate flag to enable ramping of the brake pressure. This is provided at step 108 after the initial apply has been completed as sensed at step 90 by ramping the value of the apply current $I_a$ at a rate that may, for example, be based upon the particular apply mode sensed at step 74. Thereafter at step 110, the value of $I_{EST}$ and $I_{REF}$ are set equal to the apply current $I_a$. Thus when an incipient lockup condition is first sensed at step 74, $I_{REF}$ and the initial value of $I_{EST}$ each represent the peak pressure $P_{REF}$ during the apply phase. These values are then used as previously described to estimate the brake pressure at the end of the resulting release phase and the initial apply current and period $T_{init}$ to be used in the subsequent pressure apply phase. Thereafter, the program commands the motor current at the value $I_a$ in the forward direction at step 98.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A method of controlling a brake pressure applied to a brake of a vehicle wheel traveling over a road surface in a vehicle braking system having a pressure modulator including a motor for generating a motor torque in response to motor current to control an applied brake pressure value, the method comprising the steps of:

sensing an incipient wheel lockup condition;

controlling the motor current to release brake pressure when an incipient wheel lockup condition is sensed to allow wheel recovery from the incipient wheel lockup condition;

sensing recovery from the incipient wheel lockup condition;

controlling motor current, when recovery is sensed, to achieve an initial current value corresponding to a desired initial apply pressure value, for an initial apply time established by a predetermined relationship to a brake pressure increase from a released brake pressure to the desired initial apply pressure, the initial apply time established by the predetermined relationship enabling the motor to achieve a condition whereat a predictable relationship exists between the motor current and brake pressure.

2. The method of claim 1 wherein the desired initial apply pressure value has a predetermined relationship to the brake pressure when an incipient wheel lockup condition is first sensed and further including the step of determining an amount of released brake pressure when the motor current is controlled to release brake pressure, the brake pressure increase from the released brake pressure to the desired initial apply pressure being represented by the determined amount of released brake pressure.

3. A method of controlling a brake pressure applied to a brake of a vehicle wheel traveling over a road surface in a vehicle braking system having a pressure modulator including a motor for generating a motor torque in response to motor current to control applied brake pressure value, the method comprising the steps of:

sensing an incipient wheel lockup condition;

storing a value $P_{REF}$ of the brake pressure as represented by a value $I_{REF}$ of motor current at the time an incipient wheel lockup condition is first sensed;

controlling the motor current to release brake pressure when an incipient wheel lockup condition is sensed to allow wheel recovery from the incipient wheel lockup condition;

sensing recovery from the incipient wheel lockup condition;

estimating a brake pressure $P_{EST}$ at the time recovery from the incipient wheel lockup condition is first sensed;

controlling motor current, when a recovery is sensed, to achieve an initial current value corresponding to a desired initial apply pressure value, for an initial time that is a predetermined function of the difference between $P_{REF}$ and $P_{EST}$, the initial time established by the predetermined function enabling the motor to achieve a condition whereat a predictable relationship exists between the motor current and the brake pressure.

4. The method of claim 3 wherein the step of estimating the brake pressure $P_{EST}$ includes (A) establishing an initial current value $I_{EST}$ equal to the value $I_{REF}$ and (B) decaying the value of $I_{EST}$ from the initial current value while motor current is controlled to release brake pressure so as to mimic the released brake pressure, the decayed value of $I_{EST}$ at the time recovery from the incipient wheel lockup condition is first sensed comprising the estimated brake pressure $P_{EST}$.

5. A method of controlling a brake pressure applied to a brake of a vehicle wheel traveling over a road surface in a vehicle braking system having a pressure modulator including a motor for generating a motor torque in response to motor current to control applied brake pressure value, the method comprising the steps of:

sensing an incipient wheel lockup condition;

controlling the motor current to release brake pressure when an incipient wheel lockup condition is sensed to allow wheel recovery from the incipient wheel lockup condition;

storing a value $I_{REF}$ of motor current at the time an incipient wheel lockup condition is first sensed as a measure of the brake pressure at the time an incipient wheel lockup condition is first sensed;

sensing recovery from the incipient wheel lockup condition;

establishing an initial current value $I_{EST}$ equal to the stored value $I_{REF}$;

decaying the value of $I_{EST}$ from the initial current value while motor current is controlled to release brake pressure so as to mimic the released brake pressure, the decayed value of $I_{EST}$ at the time recovery from the incipient wheel lockup condition is first sensed comprising an estimate of the brake pressure at the time recovery from the incipient wheel lockup condition is first sensed:

controlling motor current, when a recovery is sensed, to an initial current value corresponding to a desired initial apply brake pressure value, for an initial time that is a predetermined function of the difference between $I_{REF}$ and the decayed value of $I_{EST}$ at the time recovery from the incipient wheel lockup condition is first sensed, the initial time established by the predetermined function enabling the motor to achieve a condition whereat a predictable relationship exists between the motor current and brake pressure.

* * * * *